Nov. 10, 1959  E. C. HENDERSON  2,911,698
CORD FASTENER
Filed Oct. 8, 1958
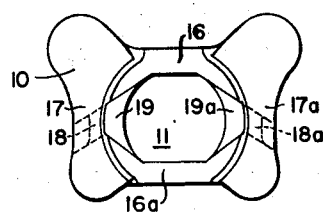
FIG.2
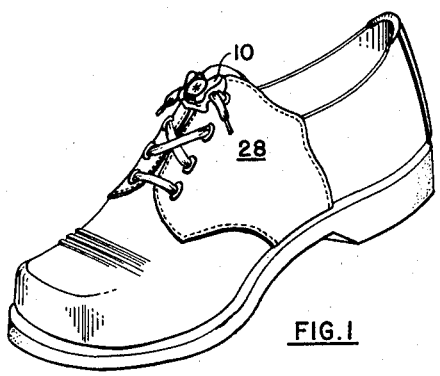
FIG.1
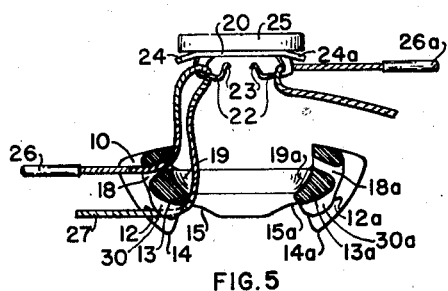
FIG.5
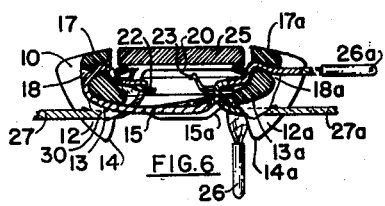
FIG.6
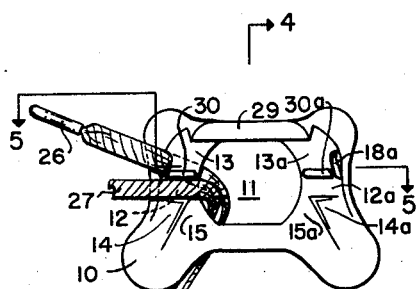
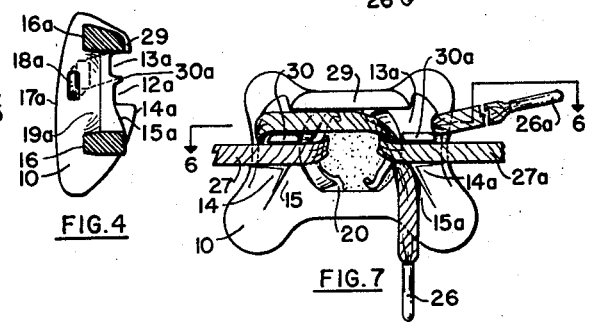
FIG.4  FIG.7
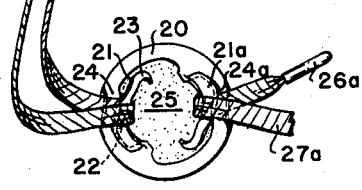
FIG.3
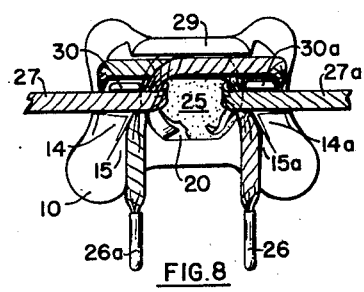
FIG.8

United States Patent Office 2,911,698
Patented Nov. 10, 1959

2,911,698

CORD FASTENER

Eldon C. Henderson, Paso Robles, Calif.

Application October 8, 1958, Serial No. 766,145

10 Claims. (Cl. 24—117)

The invention relates to fasteners for securing cords, such as shoe laces, twisted or woven string, tape, or the like, for tying shoes, bundles, neckerchiefs, or other articles. More particularly, the invention relates to improvements in the cord fastener described in my copending application, Serial No. 559,010, filed January 13, 1956.

A simple, inexpensive and secure fastener which can be applied to flexible cord parts, such as the ends of a shoe lace, with a minimum of manipulation to secure the cord parts against parting finds diversified application. An example is the tying of shoe laces, which are customarily secured by bow knots. Because children often confuse a square knot with a granny knot their shoes frequently become untied by the alternate application and release of tension incident to walking. The knotting of shoe laces is, moreover, time-consuming and awkward for some persons.

The aforesaid prior application described a durable, inexpensive and simple fastener comprising a base and a separate front member which clamps the cord parts against clamping faces on the base.

It is an object of this invention to provide an improved cord fastener of the type indicated in the preceding paragraph which is easier to apply and employ for securing the cord ends. An ancillary object is to facilitate release of the fastener.

A further object is to provide an improved fastener of the type indicated which can be manufactured at lower cost and has greater durability than similar fasteners of comparable cord-holding capability.

Still another object is to improve the clamping faces on the base and front member so as to grip the cord parts more securely.

Additional objects will become apparent from the description.

In summary, the improved fastener according to the present invention embodies the following features, which are advantageously, but not necessarily, applied in combination:

The separate clamping member is formed as a flat member, preferably a ring, having opposite margins thereof bent toward the base member to press the cord parts against the clamping faces on the base member more securely, the said faces being formed as forwardly divergent walls.

The clamping member has a marginal cord-engaging part which is integral with one or more stirrups, preferably formed as open hooks with forwardly turned tips for receiving the cord parts slidingly after forward passage into the aperture through the base and before contact with the clamping faces thereon.

The base member has projections which extend forwardly from the clamping faces and contain guide channels, preferably laterally inclined holes extending through the projections, for guiding the cord parts after emerging from the clamping faces and prior to passage onto the rear face. The sides of the base between the projections are recessed to permit the clamping member to be grasped for raising it to release the fastener.

The rear of the base has, in addition to a pair of longitudinal open channels for receiving the standing portions of the cord parts, auxiliary open channels for securing the cord parts after emerging from the guide channels described in the foregoing paragraph. The term "standing parts" is used herein to denote the portions of the cords which extend approachingly, e.g., from the eyelets of a shoe or other abutment points, to the fastener and which are secured by the fastener against parting. Moreover, the rear face has a pair of rearward projections or bosses for securing the said cord ends after being passed through the auxiliary channels and being lodged or wedged between the base and the standingn cord portions.

Having indicated the general nature of the invention, reference is made to the accompanying drawing which forms a part of this specification and shows one preferred embodiment thereof, wherein:

Figure 1 is a perspective view of a laced shoe to which the improved fastener has been applied to secure the lace;

Figure 2 is a front view of the fastener base;

Figure 3 is a rear view of the base and clamping ring, the latter being displaced and showing the cord ends only one of which is shown attached to the base;

Figure 4 is transverse sectional view of the base, taken on the line 4—4 of Figure 3;

Figure 5 is a longitudinal sectional view taken on the broken line 5—5 of Figure 3, the clamping ring being shown in elevation;

Figure 6 is a longitudinal sectional view showing the fastener in clamping condition, taken along the section line 6—6 of Figure 7; and Figures 7 and 8 are rear views of the fastener showing the intermediate and final stages, respectively, of securing the cord ends between the standing portions thereof and the base.

Referring to the drawing in detail, the fastener includes a base 10 having a large central aperture 11 which extends therethrough. The base is elongated longitudinally and laterally to lie against the article to be secured. The rear face is shaped to form a pair of principal, longitudinal, open channels or grooves 12, 12a, which extend divergently from the aperture for receiving the standing portions of the cord ends, these portions being situated in approaching relation along the article, as will appear. The principal purpose of recessing the standing portions within the base is to secure said portions against lateral shifting so that the cord ends, after emerging from the clamping faces, described hereinafter, can be lodged more securely between the base and the said standing portions. Recessing further stabilizes the orientation of the base on the article. The rear face also has a pair of auxiliary open channels 13, 13a, separated from the principal channels by ridges 30 and 30a, which channels also extend longitudinally from opposite margins of the aperture but are laterally offset from the principal channels. The auxiliary channels are advantageously deeper than the principal channels and their bases are rounded at the ends of the base toward the front to facilitate drawing of the cord ends rearwards into the channels. A retaining ledge 29 protrudes rearwardly beyond the auxiliary channels. The rear face further has a pair of retaining abutments 14, 14a, situated adjacent to the ends of the principal channels on the sides thereof remote from the auxiliary channels. These rearwardly projecting abutments are convex and sloped forwardly toward the ends of the base, while their mutually facing sides are flat and preferably diverge in the direction away from the channels, extending rearwards from surfaces 15, 15a. These surfaces merge with the bases of the principal channels, as shown in Figure 4 and may slope toward the side.

The front of the base has flat areas 16, 16a, at the sides; they extend between forward projections 17, 17a, which are situated at the longitudinal extremities of the aperture. These projections have holes 18, 18a, extending from the aperture to the ends of the base along axes which are inclined both rearwardly and laterally toward the auxiliary channels; they form guide channels for the cord ends. The inner faces of the forward projections are arcuate when viewed from the front and are tapered slightly toward the rear.

Rearward of the plane of the flat areas 16, 16a, those side walls of the aperture which form the longitudinal extremities thereof are forwardly divergent to provide clamping faces 19, 19a, which are situated immediately to the rear of the respectively adjacent holes 18, 18a. These faces are curved concavely, both peripherally about the aperture and in the longitudinal sectional plane of Figure 5.

The base may be made of any suitable material. It is preferred to form it of a resinous or plastic material by means of a die.

The clamping member is a ring having a flat rim 20 and a pair of integral, open hooks 21, 21a, which extend rearwardly from the inner rim margin at diametrically opposite positions. The ring, which has a diameter to fit with clearance into the aperture, may be made of metal or a like durable material. The hooks are conveniently pressed from a metal blank to provide, for each hook, a part 22 which is offset from the rim plane for sliding engagement with the cord and an up-turned tip 23 which retains the cord against disengagement. These tips may be spaced from the rim, as shown, to permit the cord ends to be looped laterally onto the hooks. The parts 22 are situated forwardly from the bases of the principal channels 12, 12a, when the ring is in clamping position so that the cord ends can exert a rearward force on the ring. The marginal parts of the rim are bent rearwardly through an angle such as 10° to 80° at diametrically opposite locations adjacent to the hooks, as is indicated at 24 and 24a. These parts engage the cords and coact with the clamping faces 19, 19a. The dimensions of the base and ring are advantageously such that the rear face of the ring, between the bent portions 24, can seat on the flat areas 16, 16a, to avoid or limit rocking motion of the ring when in clamping position. A decorative or ornamental closure disc or other device 25 is fixed to the front of the ring by any suitable means, such as an adhesive.

To attach the fastener to the cord ends 26, 26a, the latter are passed forwardly through the aperture 11 and then looped individually about the hooks 21, 21a, which form stirrups. The cord ends are then passed outwards through the holes 18, 18a. This condition is shown for one cord end in Figures 3 and 5. The fastener is then ready for use; it is normally in this condition when the article is untied.

The fastener can be used to make a temporary fastening or a more secure fastening. The former is made by merely pulling the tips of the cord ends apart. The cord ends slide through the aperture, over the hooks, and out through the holes until the standing portions 27, 27a, are taut and extend approachingly along the face of the article, such as the shoe 28 as shown in Figure 1. The clamping ring is thereby pulled rearward by its hooks to clamp the cord ends against the clamping faces 19, 19a, as shown in Figure 6. Tension on the standing portions of the cord ends pulls the ring rearward to increase the clamping action.

To make a more secure fastening, the cord ends are further drawn about the ends of the base into the auxiliary channels 13, 13a, beyond the opposite ends of the base, passed above the standing portion of the respective other cord ends, and pulled under the base along projections 14, 14a onto the surfaces 15 and 15a. The cord ends slide readily along these projections because they have smooth, rounded contours. These operations are performed with one cord end at a time. The first is illustrated in Figure 7, which shows the cord end 26 drawn within the auxiliary channel 13 and thence between the standing portion 27a and the base, which it engages at the surface 15a. It is prevented from slipping out by the projection 14a and secured by the standing portion 27a. Figure 8 shows the other cord end 26a similarly lodged between the base and the standing portion 27. The free ends can then be tucked under the base as desired. It is evident that the temporary fastening secures the cord ends while the final operations are performed.

To release the fastener the cord ends are removed from their lodged positions beneath the base and the clamping ring is grasped above the flat areas 16, 16a and pulled forward. This immediately releases the clamping action, permitting the ring to be pulled away to the position shown in Figure 3. This is facilitated by recessing the sides of the base between the forward projections, i.e., adjacent the flat areas 16, 16a.

I claim as my invention:

1. A fastener for securing a pair of flexible cord parts which include standing portions to be secured against parting extending approachingly along an article, said fastener comprising: a base having an aperture for the forward passage of the cord parts beyond said standing portions and providing clamping faces on the aperture sides; and a clamping member which is movable bodily away from the base and is shaped to clamp said cord parts against said clamping faces by means of the marginal parts of the clamping member when the latter is moved rearwards, said member having a pair of hooks with free ends over which said cord parts can be looped and retained with sliding fits before engaging said clamping faces, said hooks being situated forwardly from the rear of the base when the clamping member is in clamping position.

2. A fastener according to claim 1 wherein said hooks have forwardly directed tips for retaining the cord parts.

3. A fastener according to claim 1 wherein said clamping member is a ring and said hooks are formed integrally therewith and extend rearwards therefrom at the open part thereof.

4. A fastener for securing a pair of flexible cord parts which include standing portions to be secured against parting extending approachingly, along an article, said fastener comprising: a base having an aperture for the forward passage of the cord parts beyond said standing portions and providing forwardly diverging clamping faces on the aperture sides; and a flat clamping member which is movable bodily away from the base and has spaced marginal portions thereof bent rearwards to clamp said cord parts against said clamping faces by engagement with the edges of the said marginal portions, said clamping member having at least one stirrup providing an opening through which a cord part can be passed with a sliding fit before engaging a clamping face, said stirrup being situated forwardly from the rear of the base when the clamping member is in clamping position.

5. A fastener according to claim 4 wherein said clamping member is a flat ring and said stirrup is integral therewith and offset rearwardly from the plane of the ring.

6. A fastener for securing a pair of flexible cord parts which include standing portions to be secured against parting extending approachingly along an article, said fastener comprising: a base having an aperture for forward passage of said cord parts beyond said standing portions, opposite parts of the aperture side wall being forwardly divergent to provide clamping faces, said base having a pair of projections extending forwardly from said clamping faces, each said projection being formed with a hole therethrough for receiving a cord part slidingly after emerging from the adjoining clamping face; and a plate-like clamping member which is movable bodily away from the base and is shaped to fit between said projections, said member having marginal parts thereof situated to clamp said cord parts against the clamping faces, said clamping member having at least one stirrup providing an opening through which a cord part can be passed slidingly before engaging a clamping face, the two sides of the base which lie between said projections being recessed from the front toward the rear for a depth beyond the rear of the clamping member when the latter is in clamping position, whereby said member can be grasped at opposite margins thereof.

7. A fastener according to claim 6 wherein said base is shaped to provide a pair of forwardly directed abutments situated at said recessed sides and positioned for engagement by the rear of the clamping member.

8. A fastener for securing a pair of flexible cord parts which have standing portions to be secured against parting extending approachingly along an article, which fastener comprises: a base having a central aperture for the forward passage of the cord parts when the base overlies said standing portions, a pair of opposite side walls of the aperture being forwardly divergent to form clamping faces, said base having forwardly of said clamping faces guide channels for receiving the cord parts after emerging from said clamping faces; and a clamping ring which is movable bodily away from the base and is of a size to clamp said cord parts against said clamping faces when moved rearwards, and a pair of stirrups offset rearwardly from the ring for receiving said cord parts slidingly after forward passage into said aperture and prior to engagement with said clamping faces.

9. A fastener according to claim 8 wherein said base has at the rear thereof a pair of principal channels extending divergently from said aperture for receiving the said standing portions of the cord parts, and auxiliary channels for securing the cord parts after emerging from said guide channels.

10. A fastener for securing a pair of flexible cord parts which have standing portions to be secured against parting extending approachingly along an article, which fastener comprises: a base having a central aperture, the rear face thereof having a pair of principal open channels extending in divergent longitudinal directions from the aperture for receiving said standing cord portions when the base lies against said article, those side walls of the aperture which define the longitudinal extremities thereof being forwardly divergent to form clamping faces, said base having portions thereof extending forwardly of said clamping faces and formed with a pair of holes which extend therethrough in divergent longitudinal directions, and said rear face being formed to provide an auxiliary open channel for receiving the cord parts after passage forwardly through said aperture along the clamping faces and out through said holes; and a clamping ring which is movable bodily away from the base and has a predominantly flat shape but has the opposite margins thereof bent rearwards, said ring being of a size to clamp said cord parts against said clamping faces by means of said bent margins, and a pair of stirrups projecting rearwards from said ring at the opposite sides thereof adjacent to said bent margins for receiving said cord parts slidingly after forward passage into said aperture and prior to engagement with said clamping faces, said stirrups being situated forwardly of said principal channels.

References Cited in the file of this patent

UNITED STATES PATENTS

| | | |
|---|---|---|
| 2,236,506 | Hirsch | Apr. 1, 1941 |
| 2,443,335 | Vogel | June 15, 1948 |